(12) United States Patent
Mueller

(10) Patent No.: US 8,373,704 B1
(45) Date of Patent: Feb. 12, 2013

(54) SYSTEMS AND METHODS FOR FACILITATING OBJECT MOVEMENT USING OBJECT COMPONENT RELATIONSHIP MARKERS

(75) Inventor: Eric J. Mueller, Fremont, CA (US)

(73) Assignee: Adobe Systems Incorporated, San Jose, CA (US)

( * ) Notice: Subject to any disclaimer, the term of this patent is extended or adjusted under 35 U.S.C. 154(b) by 779 days.

(21) Appl. No.: 12/197,795

(22) Filed: Aug. 25, 2008

(51) Int. Cl.
G06T 13/00 (2006.01)
G06T 15/00 (2006.01)

(52) U.S. Cl. ................. 345/473; 345/419; 345/474

(58) Field of Classification Search ............ 345/419, 345/473, 474
See application file for complete search history.

(56) References Cited

U.S. PATENT DOCUMENTS

| | | | | |
|---|---|---|---|---|
| 5,594,856 | A * | 1/1997 | Girard .................. | 345/473 |
| 5,764,241 | A * | 6/1998 | Elliott et al. ............ | 345/473 |
| 5,806,080 | A | 9/1998 | Purple et al. | |
| 5,835,693 | A | 11/1998 | Lynch et al. | |
| 5,889,528 | A | 3/1999 | Zhao | |
| 5,889,532 | A | 3/1999 | Boucher et al. | |
| 5,909,218 | A * | 6/1999 | Naka et al. ............ | 345/419 |
| 5,982,389 | A | 11/1999 | Guenter et al. | |
| 6,088,035 | A | 7/2000 | Sudarsky et al. | |
| 6,141,019 | A | 10/2000 | Roseborough et al. | |
| 6,160,907 | A * | 12/2000 | Robotham et al. ...... | 382/154 |
| 6,341,246 | B1 | 1/2002 | Gerstenberger et al. | |
| 6,380,941 | B2 | 4/2002 | Mochizuki et al. | |
| 6,400,368 | B1 * | 6/2002 | Laperriere .............. | 345/473 |
| 6,462,742 | B1 | 10/2002 | Rose et al. | |
| 6,538,654 | B1 * | 3/2003 | Rose et al. ............ | 345/473 |
| 6,559,845 | B1 * | 5/2003 | Harvill et al. ........... | 345/473 |
| 6,563,504 | B1 * | 5/2003 | Rose et al. ............ | 345/473 |
| 6,738,065 | B1 | 5/2004 | Even-Zohar | |
| 6,774,885 | B1 | 8/2004 | Even-Zohar | |
| 6,822,653 | B2 * | 11/2004 | Boyd et al. ............ | 345/474 |
| 6,840,127 | B2 | 1/2005 | Moran | |
| 6,924,803 | B1 * | 8/2005 | Girling et al. .......... | 345/473 |
| 6,937,240 | B2 | 8/2005 | Sasaki | |
| 7,034,835 | B2 * | 4/2006 | Whatmough ........... | 345/473 |
| 7,242,405 | B2 | 7/2007 | Cohen et al. | |
| 7,259,764 | B2 * | 8/2007 | Anderson .............. | 345/473 |
| 7,420,544 | B2 | 9/2008 | Ono et al. | |
| 7,646,383 | B1 * | 1/2010 | Taylor ................... | 345/420 |
| 7,859,538 | B2 * | 12/2010 | Isner et al. ............ | 345/473 |

(Continued)

OTHER PUBLICATIONS

Doug L. James and Christopher D. Twigg, "Skinning mesh animations", ACM SIGGRAPH 2005 Papers (SIGGRAPH '05), Markus Gross (Ed.), Jul. 31-Aug. 4, 2005, ACM, New York, NY, pp. 399-407.*

(Continued)

*Primary Examiner* — Ulka Chauhan
*Assistant Examiner* — Roberta D Prendergast
(74) *Attorney, Agent, or Firm* — Kilpatrick Townsend & Stockton LLP (57) ABSTRACT

Methods and systems for facilitating object movement using markers are disclosed. A marker may provide information about a "binding" that specifies how a component of an object will automatically move in response to a movement of another component of the object. By using bindings to link the movements of an objects' components, a developer can simplify how the object's movement is controlled, for example, so that moving one component causes the rest of the components to automatically move in a desired manner. Displaying markers for these bindings provides, among other things, a convenient means for a developer to observe and/or change a component's movement behavior (i.e., the behavior that is specified by the bindings).

17 Claims, 6 Drawing Sheets

U.S. PATENT DOCUMENTS

| | | | |
|---|---|---|---|
| 7,872,653 B2 * | 1/2011 | Zhou et al. | 345/473 |
| 2003/0034979 A1 * | 2/2003 | Nakamura et al. | 345/474 |
| 2003/0090523 A1 * | 5/2003 | Hayashi et al. | 345/782 |
| 2003/0146915 A1 * | 8/2003 | Brook et al. | 345/473 |
| 2003/0234788 A1 * | 12/2003 | Uesaki et al. | 345/473 |
| 2004/0106916 A1 | 6/2004 | Quaid et al. | |
| 2004/0149065 A1 | 8/2004 | Moran | |
| 2004/0189646 A1 * | 9/2004 | Hayashi et al. | 345/473 |
| 2005/0270295 A1 | 12/2005 | Cohen et al. | |
| 2006/0061574 A1 | 3/2006 | Ng-Thow-Hing et al. | |
| 2006/0087510 A1 | 4/2006 | Adamo-Villani et al. | |
| 2006/0274070 A1 | 12/2006 | Herman et al. | |
| 2008/0024487 A1 * | 1/2008 | Isner et al. | 345/420 |
| 2008/0148157 A1 | 6/2008 | Kamdar et al. | |
| 2008/0294285 A1 | 11/2008 | Shoham | |

OTHER PUBLICATIONS

Mark Love, "Volumetric Mesh Editor", MSc Dissertation, University of Glasgow, Sep. 2000, 65 pages.*

Adrian De la Mora & Mehma Sachdeva, "Jabberwocky", Thesis Previsualization, New York University, Center for Advanced Digital Applications, Dec. 17, 2007, 84 pages.*

Yam CS, "Using Macromedia Flash for electronic presentations: a new alternative", American Journal of Roentgenology, AJR, 2006; vol. 187, pp. W207-W217.*

Zang, Tao, "Rendered Animated Scene and its application in Interactive Games", The University of Edinburg, School of Arts, Culture and Environment, pp. 1-26, 2000.*

Chris Maraffi, "Softimage©|XSITM Character Animation f/x & Design", ® 2001, chapters 1,4 and 5, Published by Coriolis Group Books (Dec. 18, 2000), 79 pages.*

Steve Capell, Seth Green, Brian Curless, Tom Duchamp, and Zoran Popović, Jul. 21-22, 2002, "A multiresolution framework for dynamic deformations", Proceedings of the 2002 ACM SIGGRAPH/Eurographics symposium on Computer animation (SCA '02). ACM, New York, NY, USA, pp. 41-47.*

Lander, Jeff, "Skin Them Bones: Game programming for the Web Generation", Game Developer Magazine, May 1998, pp. 11-16.*

"Run-Time Skin Deformation," Jason Weber, Intel Architecture Labs. Proceedings of Game Developers Conference, Mar. 2000.

U.S. Appl. No. 12/197,598, filed Aug. 25, 2008.

U.S. Appl. No. 12/197,844, filed Aug. 25, 2008.

U.S. Appl. No. 12/197,746, filed Aug. 25, 2008.

U.S. Appl. No. 12/197,684, filed Aug. 25, 2008.

Davis, et al., "Informal Animation Sketching: Requirements and Design", *American Association for Artificial Intelligence*, Copyright © 2002, 7 pages.

Gascuel, Jean-Dominique, et al., "Displacement Constraints for Interactive Modeling and Animation of Articulated Structures", *In the Visual Computer*, vol. 10, No. 4, Mar. 1994, pp. 191-204.

Office Action dated Apr. 4, 2011 in U.S. Appl. No. 12/197,684.

Office Action dated Apr. 7, 2011 in U.S. Appl. No. 12/197,746.

Office Action dated Apr. 7, 2011 in U.S. Appl. No. 12/197,844.

Rose, C.F., Sloan, P.P.J., and Cohen, M.F.., Sep. 2001, "Artist-Directed Inverse-Kinematics Using Radial Basis Function Interpolation", Computer Graphics Forum, vol. 20, Issue 3, pp. 239-250.

Non Final Office Action in related U.S. Appl. No. 12/197,746 dated Nov. 9, 2011, 68 pages.

* cited by examiner

SYSTEMS AND METHODS FOR FACILITATING OBJECT MOVEMENT USING OBJECT COMPONENT RELATIONSHIP MARKERS

FIELD

Embodiments relate generally to the field of computing and specifically to computing applications used to create, control, and otherwise display objects.

BACKGROUND

Media often involves the display of animated or moving objects. For example, a media object may consist of a series of frames played one after another by a media player. The sequential playing of the frames gives the appearance of objects within the frames moving over time. Development of such media can involve painstakingly creating each object in each frame independently. For example, animating a car moving down a street may involve redrawing the street and the car in a different position on the street in each of a series of multiple frames. Certain techniques exist to help developers simplify this otherwise painstaking and repetitive process. Some development tools allow a developer to reuse elements of a previous frame in a subsequent frame. For example, a developer may need to draw the street and the car only once to create the frames of the previous example. After drawing the street and the car for a first frame, the developer can save these objects in a first frame and then use them as a basis for created subsequent frames. A development tool may, for example, allow the developer to simply reposition the car object and save the second frame, reposition the car again and save the third frame, etc. Another technique that can simplify the process of creating animation involves extrapolating between frames created by a developer. In the previous example, a developer may create a first frame with the car at one end of a street and a second frame with the car at a second end of the street. The development tool can use the first and second frames as end points to create additional frames for inclusion in the play sequence of frames. For example, the positions of the car in the end frames can be used to determine several intermediate positions of the car on the street for intermediate frames.

In spite of these and other powerful features, present authoring and media environments could improve with respect to facilitating the movement of more complicated objects. In particular, moving objects that have multiple, interrelated components continue to present various challenges. One example, is the complexity involved in animating a person or figure waving his or her hand or picking up an object on the ground. The more complex the figure (i.e., the more components it has), the more difficult this task is for the developer. In many cases, the developer will be required to redraw (or reposition) each component of the object, e.g., the hand, the forearm, the upper arm, the shoulder, the head, etc.

SUMMARY

Methods and systems for facilitating object movement using markers are disclosed. A marker may provide information about a "binding" that specifies how a component of an object will automatically move in response to a movement of another component of the object. By using bindings to link the movements of an objects' components, a developer can simplify how the object's movement is controlled, for example, so that moving one component causes the rest of the components to automatically move in a desired manner. Displaying markers for these bindings provides, among other things, a convenient means for a developer to observe and/or change a component's movement behavior (i.e., the behavior that is specified by the bindings).

One exemplary method comprises displaying an object on a canvas area of a media content development environment. The object comprises a shape for providing an appearance attribute of the object, a plurality of bones for controlling movement of the object, and a control point at a location on the shape. The control point is associated with a binding that provides a relationship between the control point and a bone of the plurality of bones. This relationship controls the movement of the shape by providing for the movement of the control point based on the movement of the bone. The method further comprises displaying a binding marker in response to receiving an identification of the bone as a selected bone. The binding marker indicates the existence of the relationship between the control point and the selected bone by indicating the location of the control point on the shape. The method may further comprise receiving an adjustment of how the movement of the selected bone will affect the movement of the control point.

Another exemplary method comprises displaying an object on a canvas area of a media content development environment. The object comprises a shape providing an appearance attribute of the object, a plurality of bones for controlling movement of the object, and a plurality of control points at locations on the shape. Each of the plurality of control point is associated with a binding that provides a relationship between the control point and a bone. This relationship controls the movement of the shape by providing for the movement of the control point based on the movement of the bone. The method further comprises displaying a binding marker in response to receiving an identification of a selected control point of the plurality of control points of the object. The binding marker identifies a binding associated with the selected control point by marking a binding-marked bone of the plurality of bones.

In other embodiments, a computer-readable medium (such as, for example, random access memory or a computer disk) comprises code for carrying out the methods described herein.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF EXEMPLARY EMBODIMENTS

Methods and systems for facilitating object movement using markers are disclosed. A marker may provide information about a "binding" that specifies how a component of an object will automatically move in response to a movement of another component of the object. By using bindings to link the movements of an objects' components, a developer can simplify how the object's movement is controlled, for example, so that moving one component causes the rest of the components to automatically move in a desired manner. Displaying markers for these bindings provides, among other things, a convenient means for a developer to observe and/or change a component's movement behavior (i.e., the behavior that is specified by the bindings).

A multi-component may comprise one or more connected "bones" that are used to control the movement of the object, and one or more surrounding shapes used to provide display attributes, such as a surrounding figure. Just as a human figure/body is comprised of a plurality of bones, each bone being interconnected, and having a relationship with the adjacent bones, a bone-shape-based object can be considered to comprise a plurality of components that are also called "bones." In one aspect, a bone may be visualized as a straight line, or alternatively the bone may be visualized or displayed as a shape. Each of these bones, will typically, have a base point and a tip point, approximately at each end of the bone. Attachment of bones may involve a first bones base being attached at a second bone's tip. This "attachment" can be used by a development tool to coordinate movement of the object, i.e., when one bone moves the other bone will move to preserve the attachment. An outer shape may also be drawn and include various control points on the shape bound to one or more bones within the shape. When a bone is moved, any control points associated with the moved bone will cause the shape to move and/or deform. For example, a single action by a developer moving a "hand" bone to move to a new position can automatically results in the repositioning of many (or all) of the other bones and/or shapes of the figure object, e.g., the forearm, upper arm, shoulder, hand, etc.

Displaying markers that provide information about these bindings between control points and bones provides, among other things, a convenient means for a developer to see and/or change the movement behavior of the components of an object. For example, a developer may move a bone and observe that the shape is not responding to the bone's movement in a desired way. The developer can select the bone to see markers identifying the locations of the control points on the shape that are bound to that bone. Observing these markers, the developer may choose to remove a control point, add control point, or otherwise make a change to one or more control points to change the response movement behavior of the shape. A developer can than repeat the original movement of the bone to test whether the shape is now responding to the bone's movement in the desired way. In other words, the binding markers, among other things, provide feedback about bindings that a developer can use in adjusting the movement relationships between the components of a multi-component.

Illustration of Development of an Object

The following specific illustrative embodiment is provided to illustrate some of the applications, uses, and benefits of certain of the techniques described herein. Referring now to the drawings in which like numerals indicate like elements throughout the several figures, FIGS. 2a-h provide an example of a developer creating and changing an object. The developer creates an object 200 by creating a shape 204 on a canvas 2 displayed on an interface 215 of a computer screen in a media content authoring environment. The developer next places several bones within the shape. Specifically, the developer first places a bone 201 and then places another bone 202 extending from the tip of the bone 201 and another bone 203 extending from there.

Figure 2A:
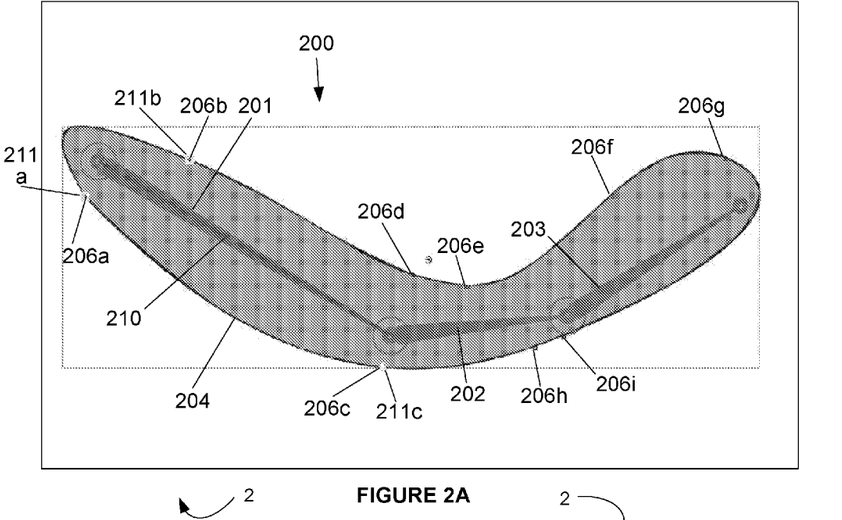
FIGS. 2*a-h* provide an example of creating, displaying, and changing an object, according to certain embodiments.

The bones 201, 202, 203 are drawn by the developer within the displayed shape 204 and are automatically associated or linked to the shape 204 by the content authoring environment. For example, various control points 206a-i along the perimeter of the shape 204 may be automatically associated with one or more of the bones 201, 202, 203. These automatically generated control points are used by the authoring environment to move the shape 204 based on movement of the bones 201, 202, 203. For example, the distance between a control point and the bone or bones with which it is associated may be preserved (as best as is possible) as the bone or bones move. If a point on a bone is associated with two bones, i.e. by two bindings, the position of this point may be determined to preserve the relative position of the control point with respect to both bones. In general, if a user does something that moves a bone, the shape moves or otherwise changes appropriately based on its relationship to the bone.

In FIG. 2a, the developer selects bone 201, for example, by clicking while the mouse cursor is positioned on the bone 201. When the bone 201 is selected, the control points 206a-c bound to that bone (i.e., where a binding exists between the selected bone and the control point) are distinguished with displayed markers 211a-c from control points 206d-i that are not bound to the selected bone 201. Similarly, as shown in FIG. 2b, when the developer selects bone 202, the control points bound to that bone are distinguished with displayed markers 213c-e, h-i from control points 206a-b, f-g that are not bound to the selected bone 202.

Figure 2B:
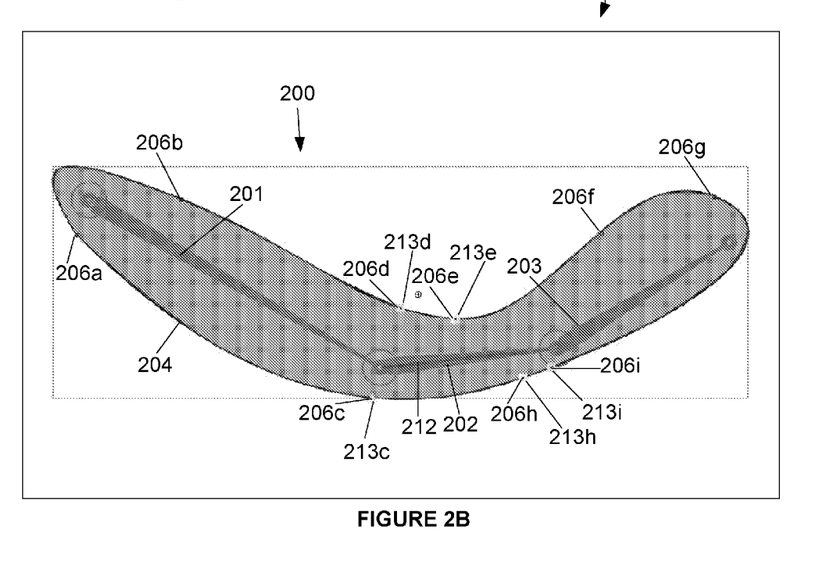

FIGS. 2a and 2b illustrate an exemplary way of including information about bindings between bones and control points in a media content development environment. Providing binding information to a developer in this exemplary way allows the developer to appreciate why the shape moves as it does when the object bones are moved. The developer may then change the bindings between bones and control points, for example, by interacting with the displayed markings. As a specific example, the developer could select and delete a particular marker. A selected bone may itself be marked with a marker 210 (FIG. 2a), 212 (FIG. 2b) distinct from the markers for the items to which it is bound. For example, a user interface of the development environment may consistently use a color, i.e., red, to indicate a selected item, and may use another color, i.e., yellow, to indicate items bound to or otherwise associated with the selected item. Similarly, a control point marker may have an attribute that provides an indication of other attributes of its bindings. For example, a control point bound to a single bone could have a square shaped marker, while a control point bound to multiple bones bounds could have a triangle shaped marker.

Figure 2C:
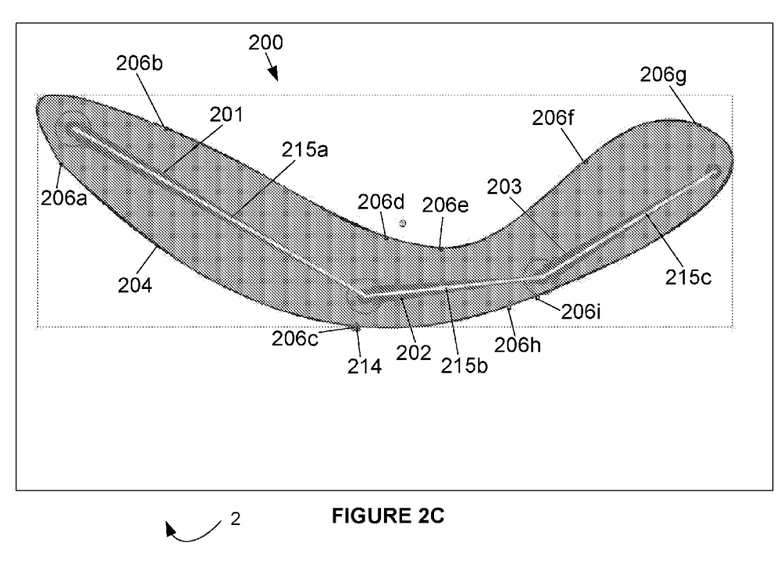

FIG. 2c illustrates another exemplary way of including information about bindings between bones and control points in a media content development environment. As shown in FIG. 2c, when a developer selects a control point 206, the bones 201, 202, 203 bound to that selected control point 214 are marked with displayed markers 215a-c. The developer could then change one or more of these bindings, for example, by deleting a binding between the control point and one of the bones.

Once the developer has created an object 200 and provided or accepted an initial binding configuration, the developer may use the object to define an animation, for example by taking snapshots of the object in various positions and then using the multiple snapshots to define animated movement. For example, the developer could take a snapshot of the object in a first position 212 and associate it with an instance 222 on a timeline 221 of the media content authoring environment 225, shown in FIG. 2h. The developer may then move the shape to a new position and associate the newly positioned shape with a later point 223 along the timeline 221. When the timeline 221 is later used to create media content, the application may extrapolate positions for the starting and ending locations associated with each of the timeline snapshot points 222, 223. For more precise control of the movement, a developer can simply place additional snapshots in the timeline 221 or otherwise reduce the time between snapshots, among other things.

Figure 2D:
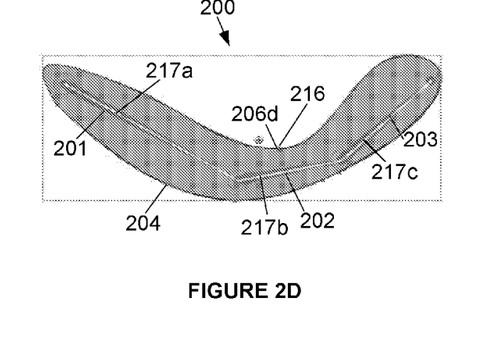
Figure 2E:
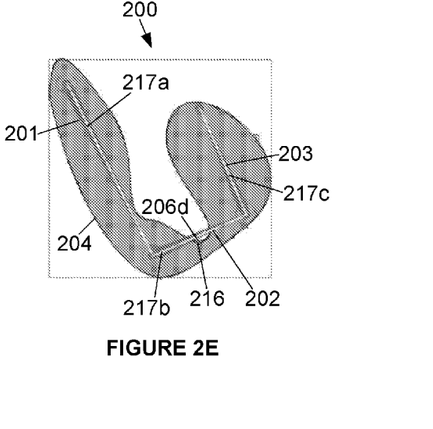

FIGS. 2d and 2e illustrate an object 200 before and after it is moved. In FIG. 2d, the object comprises a shape 204 associated with three bones 201, 202, 203. As shown by marker 216, a control point 206d has been selected and the interface has provided markers 217a-c indicating that the three bones 201, 202, 203 are each bound to the selected control point 206d. FIG. 2e illustrates movement of the object 200. A developer may desire to adjust the appearance so that the object will behave (i.e., appear) differently when bones are moved.

Figure 2F:
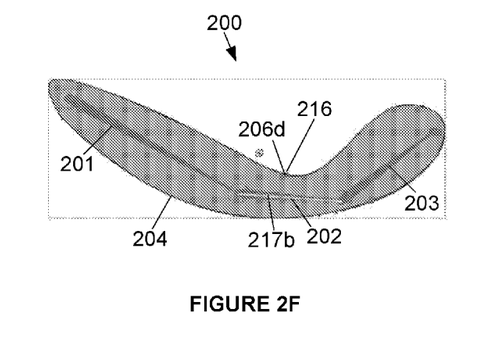
Figure 2G:
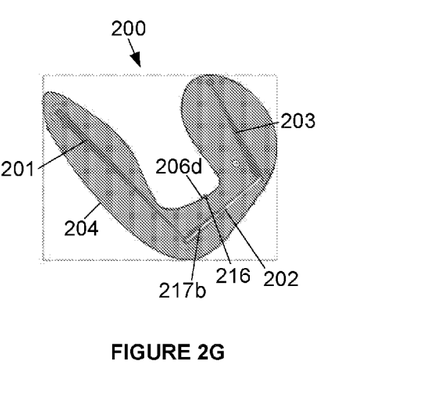
Figure 2H:
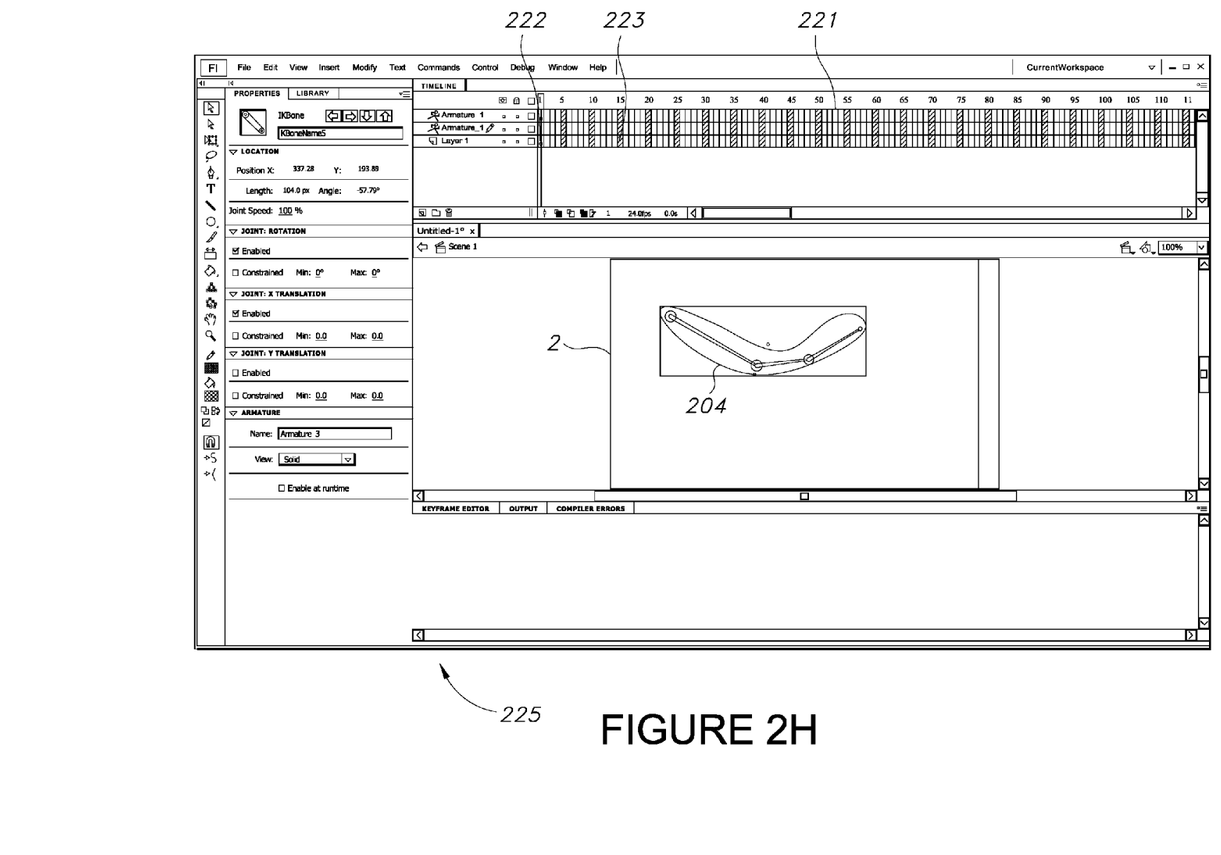

FIGS. 2f and 2g illustrate the effect of a change made to the binding configuration of the object 200. The bindings 217a, 217c between the selected control point 206d and two of the bones 201, 203 have been removed. The developer may have, for example, selected each of the two bindings and pressed the delete key on a keyboard for each. After the bindings are changed, the developer may test the responsiveness of the object to bone movement. For example, as shown in FIG. 2g, the appearance behavior of the object may be closer to the appearance behavior desired by the developer, e.g., the developer may prefer the appearance behavior illustrated in FIG. 2g over the appearance behavior illustrated in FIG. 2e. A developer may of course refine the bindings and other attributes of an object in an iterative way to achieve a desired appearance behavior.

FIGS. 2a-h also illustrate how the movement of an object 200 can be controlled. For example, control may be based on identification of an end effector and a target point or location. A developer might use a mouse device to specify an end effector and a target location. The developer clicks the mouse when the mouse cursor is located on a specified end effector location on the object 200. The developer continues to hold the mouse button down as he moves the mouse cursor across the canvas 2 to a final target location, where the mouse button is released. At the conclusion of this mouse movement, the object 200, will have moved according to the target location and end effector and the bindings and other characteristics of the object. The movements illustrated in FIGS. 2d-g may have been controlled in this manner, for example.

Moving the mouse cursor across the canvas 2 may have generated a stream of target locations that could be used to iteratively move the object, allowing the developer to see the changes to the object 200 as he drags the mouse. For each new target location of the stream of target locations, an appropriate movement of the object 200 is determined and displayed.

The amount of movement may be constrained in various ways, e.g., with angular limitations, positional limitations, etc. In certain cases, these constraints may prevent the end effector from being positioned at the target location, however, movements may be determined and displayed to position the end effector nearer to the target location. Thus, positioning the end effector nearer to the target location may comprise positioning it as close to the target location as possible and in some cases positioning it at the target location.

These illustrative examples are given to introduce the reader to the general subject matter discussed herein and are not intended to limit the scope of the disclosed concepts. The following sections describe various additional embodiments and examples of methods and systems for monitoring content consumption.

Illustrative Authoring and Runtime Environments

Figure 1:
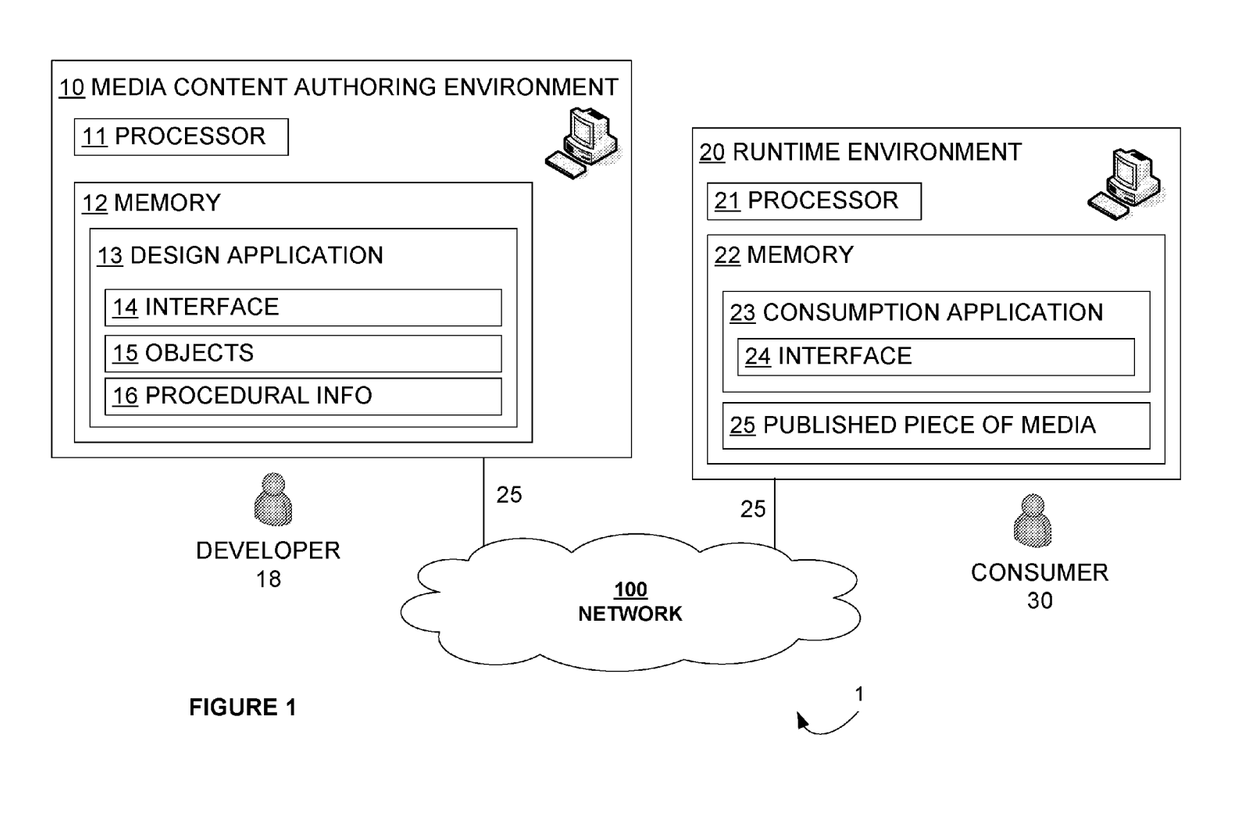
FIG. 1 is a system diagram illustrating a media content authoring environment and an exemplary runtime environment according to certain embodiments.

FIG. 1 is a system diagram illustrating a media content authoring environment 10 and an exemplary runtime environment 20 according to certain embodiments. Other embodiments may be utilized. The system 1 shown in FIG. 1 comprises a media content authoring environment 10, which may, for example, include a computing device that comprises a processor 11 and a memory 12. A developer 18 uses the media content authoring environment 10 to author media content. The memory 12 may comprise a design application 13 with an interface 14 that the developer 18 uses for such authoring. The interface 14 may provide a graphical design area or canvas area upon which the developer 18 may place, position, and otherwise define objects 15 that will be a part of a piece of media that is being developed. Information about such objects 15 may be stored in memory 12.

The design application 13 may allow the developer 18 to create and use objects, for example, by allowing the developer 18 to position components on a graphical design area and create and revise relationships between components of an object.

The design application 13 may further allow the developer 18 to perform procedures on objects of the piece of media being developed, including performing kinematics procedures. Thus, a developer 18 may specify a two bone object and then specify end-effector and target locations for a kinematics-based movement. The design application 12 comprises procedural information 16 for carrying out these kinematics and other procedures within the design application 13, for example, by displaying the movement on a graphical design area.

Once the developer is ready to publish a piece of media to a runtime environment, the design application 13 generates a piece of media 25. The piece of media 25 may be used by another application on the developer's computing device or sent to another location, for example, through a network 100 to a runtime environment 20. The runtime environment may also include a processor 21 and a memory 22. The memory 22 will generally include a consumption application 23 that provides an interface 24 for viewing or otherwise consuming pieces of media. The piece of media 25 may be stored in memory 22 and viewed or otherwise consumed by a consumer 30 using the interface 24 of the consumption application 23.

Illustrative Method of Displaying Bindings for a Selected Bone

Figure 3:
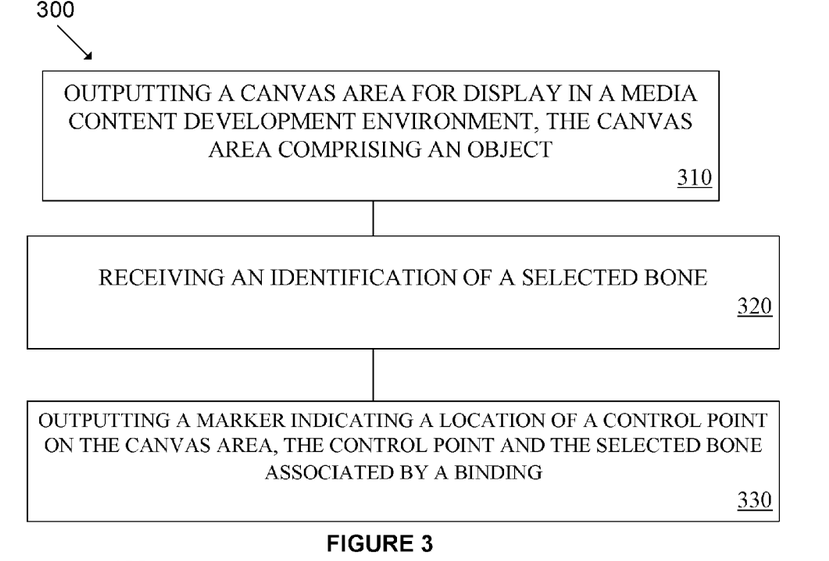
FIG. 3 is a flow chart illustrating a method of outputting a marker to display a binding for a selected bone, according to certain embodiments.

FIG. 3 is a flow chart illustrating a method of outputting a marker to display a binding for a selected bone, according to certain embodiments. For purposes of illustration only, the elements of this method 300 may be described with reference to the system depicted in FIG. 1. A variety of other implementations are also possible.

The method 300 may be computer-implemented. The method 300 comprises outputting a canvas area for display in a media content development environment, the canvas area comprising an object, as shown in block 310. This may involve receiving information about components and one or more relationships between the components of the object. These components may, as examples, comprise one or more bones and/or shapes. For example, an object may comprise a plurality of bones and a shape with a perimeter comprising a control point for which there is one or more binding associating the control point with one or more of the plurality of bones. The information about components may, as examples, comprise information connecting shape control points to the bones that provide boundary information for a spline shape, constraint information, and/or any other relevant information. A constraint may limit the movement of a bone of an object, among other things.

Receiving and/or displaying an object for a piece of media in a canvas area of a media content authoring environment can involve a system such as the system illustrated in FIG. 1. As one example, the media content authoring environment 10 could receive in the interface 14 of a design application 13 one or more inputs from a developer 18 specifying the location of two connected bones. The interface 14 may also receive, for example, a constraint from the developer 18 specifying that the angle between the bones shall not be less than 45 degrees. As another example, the developer 18 may further specify that a shape will surround the two bones by drawing a shape around the bones and identifying that a position on the shape perimeter will be a control point associated with one or both of the two bones.

Referring again to FIG. 3, the method 300 further comprises receiving an identification of a selected bone of the plurality of bones of the object, as shown in block 320. For example, a developer may have selected a bone of the object. A developer may have, for example, selected a bone by positioning a mouse cursor on a desired bone and clicking the mouse button.

The method 300 further comprises outputting a marker indicating a location of a control point on the canvas area, as shown in block 330. The marker indicates that the control point and the selected bone are associated by a binding. The marker may have a variety of forms. A marker may be a shape that is displayed surrounding a general control point icon. A marker may be a change in color of an icon used to indicate control point icons, e.g., a different color used to distinguish control points associated with (i.e. bound to) the selected bones from control points not associated with the selected bone. As another alternative, a marker may be an icon or other mark used only to indicate the locations of control points associated with the selected bone. Generally, anything that visually distinguishes a control point location bound to the selected bone from control point locations not bound to the selected bone may be considered a marker. A marker (or an attribute a marker) may also indicate the existence of only a single binding for the control point or the existence of multiple bindings for the control point, for example, multiple bindings for the control point each associating the control point with a different bone. For example, triangular markers may indicate that a control point is bound to a single bone and square markers may indicate that a control point is bound to multiple bones.

The method 300 may further comprise outputting more than one marker indicating locations of control points on the canvas area, the control points and the selected bone associated by bindings. Outputting more than one marker indicating locations of control points on the canvas area may, for example, comprise outputting markers indicating locations of all control points having a binding to the selected bone.

The method 300 may comprise receiving a change to the binding such as a change to remove the binding or change the relative strength of the binding. Similarly, the method may further comprise receiving a new binding for a control point, the new binding associating a control point with the selected bone.

The method 300 may comprise repositioning the object, for example, in the context of a developer creating an animation of the shape by repositioning the object in various positions for an animation. Such an animation may comprise a time period over which the repositioning will be displayed by the piece of media content. The animation may comprise, for example, a first snapshot associated with a first time instance, the first snapshot comprising the position of the shape prior to repositioning; and a second snapshot associated with another time instance, the second snapshot comprising the position of the shape after repositioning.

Illustrative Method of Displaying Bindings for a Selected Control Point

Figure 4:
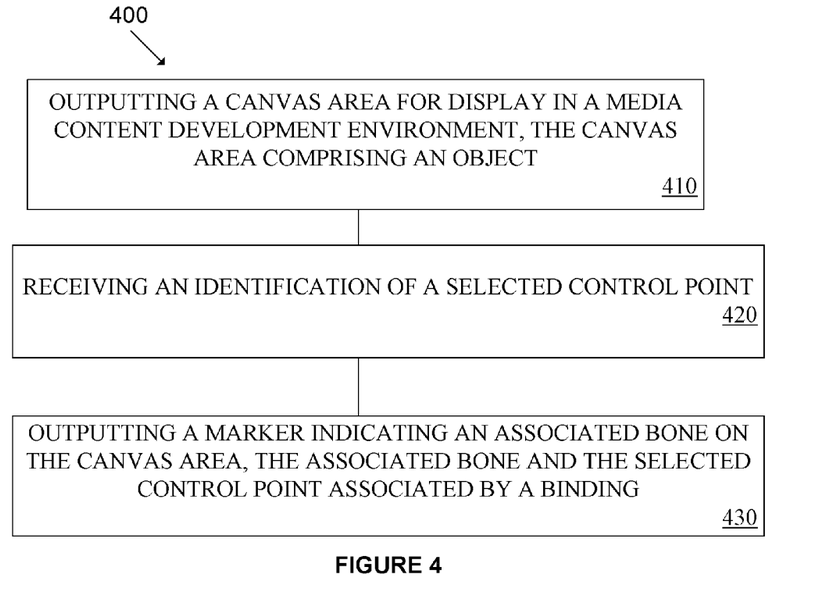
FIG. 4 is a flow chart illustrating a method of outputting a marker to display a binding for a selected control point, according to certain embodiments.

FIG. 4 is a flow chart illustrating a method of outputting a marker to display a binding for a selected control point, according to certain embodiments. For purposes of illustration only, the elements of this method 400 may be described with reference to the system depicted in FIG. 1. A variety of other implementations are also possible.

The method 400 may be computer-implemented. The method 300 comprises outputting a canvas area for display in a media content development environment, the canvas area comprising an object, as shown in block 410. This may involve receiving information about components and one or more relationships between the components of the object. These components may, as examples, comprise one or more bones and/or shapes. For example, an object may comprise a plurality of bones and a shape with a perimeter comprising a control point for which there is one or more binding associating the control point with one or more of the plurality of bones. The information about components may, as examples, comprise information connecting shape control points to the bones that provide boundary information for a spline shape, constraint information, and/or any other relevant information.

The method 400 further comprises receiving an identification of a control point as a selected control point, as shown in block 420. For example, a developer may have selected a control point of the object. A developer may have, for example, selected a control point by positioning a mouse cursor on a desired control point and clicking the mouse button.

The method 400 further comprises outputting a marker indicating an associated bone on the canvas area, the associated bone and the selected control point associated by the binding, as shown in block 430. The marker may have a variety of forms. A marker may be a shape that is displayed within and/or surrounding a displayed bone. A marker may be a change in color of a bone or portion of a bone. Generally, anything that visually distinguishes a bone bound to a selected control point from bones not bound to the selected control point may be considered a marker.

The method 400 may further comprise outputting more than one marker indicating locations of multiple bones on the canvas area, each of the bones and the selected control point associated by bindings. For example, outputting more than one marker indicating locations of bones on the canvas area may comprise outputting markers indicating locations of all bones having a binding to the selected control point.

The method 400 may further comprise receiving a change to the binding such as a change that removes the binding, a change to the relative strength of the binding, or a repositioning of the location of the control point with respect to other points of the shape perimeter. Similarly, a new binding associating a new bone with the selected control point may be specified by a developer or otherwise received.

General

Certain embodiments relate to inverse kinematics. These are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices at environments 10, 20 each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network 100 shown in FIG. 1 may comprise the Internet, in other embodiments, other networks, such as an intranet, or no network may be used. Moreover, methods may operate within a single device. Devices can be connected to a network 100 as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs.

It should also be recognized that kinematics procedures (both forward and inverse) can be used to facilitate the movement of an object (usually by adjusting angles between bones) and provide benefits in a variety of circumstances, including in the context of facilitating the animation of object-based elements in computer-based media. "Forward kinematics" refers to moving a parent bone to affect child bone(s), while "inverse kinematics" refers to moving a child bone to affect parent bone(s). Inverse kinematics may be used to facilitate the simple control of movement of an object (such as an entire arm or an entire person figure), by simply moving one component (such as a hand bone).

What is claimed is:

1. A computer-implemented method, the method comprising:
   outputting a canvas area for display in a media content development environment, the canvas area comprising an object, the object comprising:
      a shape for providing an appearance attribute of the object;
      a plurality of bones for controlling movement of the object, and
      a control point at a location on the shape, the control point associated with a binding, the binding providing a relationship between the control point and a bone of the plurality of bones, the relationship controlling movement of the shape by providing for a movement of the control point based on a movement of the bone;
   receiving an identification of the bone as a selected bone and outputting a marker marking the selected bone and distinguishing the selected bone from unselected bones; and
   outputting a binding marker for display in response to receiving the identification of the bone as the selected bone, the binding marker indicating the existence of the relationship between the control point and the selected bone by indicating the location of the control point on the shape, wherein binding markers are only displayed for control points that are related to the selected bone.

2. The method of claim 1 further comprising adjusting how the movement of the selected bone will affect the movement of the control point.

3. The method of claim 2, wherein the adjusting comprises receiving a change to the binding marker and changing the binding based on the change to the binding marker.

4. The method of claim 3, wherein the change to the binding marker identifies a new location on the shape for the control point.

5. The method of claim 2, wherein the adjusting comprises receiving an identification of a second location on the shape for a new control point associated with a new binding, and creating the new binding by creating the new control point at the second location on the shape.

6. The method of claim 5 further comprising outputting a new binding marker for display at the second location on the shape.

7. The method of claim 2, further comprising:
prior to adjusting how the movement of the selected bone will affect the movement of the control point, outputting a first movement of the shape for display in response to receiving a first movement of the selected bone; and
after adjusting how the movement of the selected bone will affect the movement of the control point, outputting a second movement of the shape for display in response to receiving a second movement of the selected bone, the second movement of the selected bone similar to the first movement of the selected bone, the second movement of the shape differing from the first movement of the shape.

8. The method of claim 1, wherein the appearance attribute of the shape provides an outer boundary for at least a portion of the object when the object is displayed.

9. The method of claim 1 further comprising outputting binding markers for display in response to receiving the identification of the selected bone, the binding markers indicating the existence of relationships between a plurality of control points and the selected bone by indicating the locations on the shape of control points having relationships with the selected bone.

10. The method of claim 1, wherein the binding marker indicates the existence of only a single binding for the control point.

11. The method of claim 1, wherein the binding marker indicates the existence of multiple bindings for the control point, each of the multiple bindings for the control point associating the control point with a different bone.

12. The method of claim 1 further comprising creating an animation based on a repositioning of the object, the animation comprises a time period over which the repositioning will be displayed by a piece of media content.

13. The method of claim 12, wherein the animation comprises:
a first snapshot associated with a first time, the first snapshot comprising the position of the shape prior to repositioning; and
a second snapshot associated with second time, the second snapshot comprising the position of the shape after repositioning.

14. The method of claim 1, wherein the movement of the bones of the plurality of bones is facilitated by an inverse kinematics procedure.

15. A system comprising:
instructions stored on a non-transitory computer readable medium;
a processor operable to execute the instructions that when executed by the processor cause the processor to:
provide an interface for displaying an object on a canvas area in a media content development environment, the object comprising:
a shape providing an appearance attribute of the object;
a plurality of bones for controlling movement of the object, and
a plurality of control point at locations on the shape, each control point associated with a binding, the binding providing a relationship between the control point and a bone, the relationship controlling movement of the shape by providing for movement of the control point based on movement of the bone;
receive an identification of the bone of the plurality of bones of the object as a selected bone and output a marker marking the selected bone and distinguishing the selected bone from unselected bones; and
output a binding marker for display in response to receiving the identification of the selected bone of the plurality of bones of the object, the binding marker indicating the existence of a binding relationship between the control point and the selected bone by indicating the location on the shape of the control point, wherein binding markers are only displayed for control points that are related to the selected bone.

16. The system of claim 15, wherein the interface further comprises an adjustment component for receiving an adjustment to how the shape will move in response to movement of the selected bone.

17. A non-transitory computer-readable medium on which is encoded program code, the program code comprising:
program code for outputting a canvas area for display in a media content development environment, the canvas area comprising an object, the object comprising:
a shape for providing an appearance attribute of the object;
a plurality of bones for controlling movement of the object, and
a control point at a location on the shape, the control point associated with a binding, the binding providing a relationship between the control point and a bone of the plurality of bones, the relationship controlling movement of the shape by providing for a movement of the control point based on a movement of the bone;
program code for receiving an identification of the bone as a selected bone and outputting a marker marking the selected bone and distinguishing the selected bone from unselected bones; and
program code for outputting a binding marker for display in response to receiving the identification of the bone as the selected bone, the binding marker indicating the existence of the relationship between the control point and the selected bone by indicating the location of the control point on the shape, wherein binding markers are only displayed for control points that are related to the selected bone.

* * * * *